United States Patent [19]

Henzler et al.

[11] Patent Number: 5,263,622

[45] Date of Patent: Nov. 23, 1993

[54] METHOD AND INSTALLATION FOR MACHINING MACHINE PARTS HAVING A BEARING EYE

[75] Inventors: Peter Henzler; Armin Tengler, both of Goeppingen, Fed. Rep. of Germany

[73] Assignee: Ex-Cell-O GmbH, Eislingen, Fed. Rep. of Germany

[21] Appl. No.: 791,042

[22] Filed: Nov. 12, 1991

[30] Foreign Application Priority Data

Nov. 14, 1990 [DE] Fed. Rep. of Germany ....... 4036213
Nov. 24, 1990 [DE] Fed. Rep. of Germany ....... 4037429

[51] Int. Cl.⁵ .............................................. B23P 17/02
[52] U.S. Cl. ..................................... 225/103; 225/100
[58] Field of Search ............... 225/100, 101, 103, 104, 225/105; 29/413, 416, 888.09

[56] References Cited

U.S. PATENT DOCUMENTS

| | | |
|---|---|---|
| 4,754,906 | 7/1988 | Brovold . |
| 4,768,694 | 9/1988 | Fabris et al. ........................ 225/100 |
| 5,105,538 | 4/1992 | Hoag et al. ...................... 29/888.09 |
| 5,131,577 | 7/1992 | Hoag et al. ........................ 225/100 |
| 5,169,046 | 12/1992 | Miessen et al. ..................... 225/103 |

FOREIGN PATENT DOCUMENTS

| | | |
|---|---|---|
| 0304162 | 2/1989 | European Pat. Off. . |
| 0167320 | 8/1989 | European Pat. Off. . |
| 0342800 | 11/1989 | European Pat. Off. . |
| 3130557 | 2/1983 | Fed. Rep. of Germany . |
| 3440601 | 5/1986 | Fed. Rep. of Germany . |
| 3535617 | 4/1987 | Fed. Rep. of Germany . |
| 8905863 | 10/1989 | Fed. Rep. of Germany . |

Primary Examiner—Daniel W. Howell
Attorney, Agent, or Firm—Barry R. Lipsitz

[57] ABSTRACT

In order to so improve a machining method for severing a machine part having a bearing eye into a first and a second bearing bushing, wherein the machine part with the bearing eye is mounted on a mandrel comprised of two halves and the halves are moved apart to sever the machine part and wherein prior to and during the severing, the first bearing bushing is fixed in the severing direction by at least one first transverse fixing element, the first bearing bushing is fixed transversely to the severing direction by two first side fixing elements and the second bearing bushing is fixed in the severing direction by at least one second transverse fixing element, that the joining following the severing can be carried out in as simple a manner as possible, it is proposed that prior to the severing, the first and second side fixing elements be positioned in an essentially tension-free manner in the advancing direction against the machine part and be held in this position resting essentially tension-free in the advancing direction against further movement in the direction opposite to the advancing direction during the severing.

14 Claims, 13 Drawing Sheets

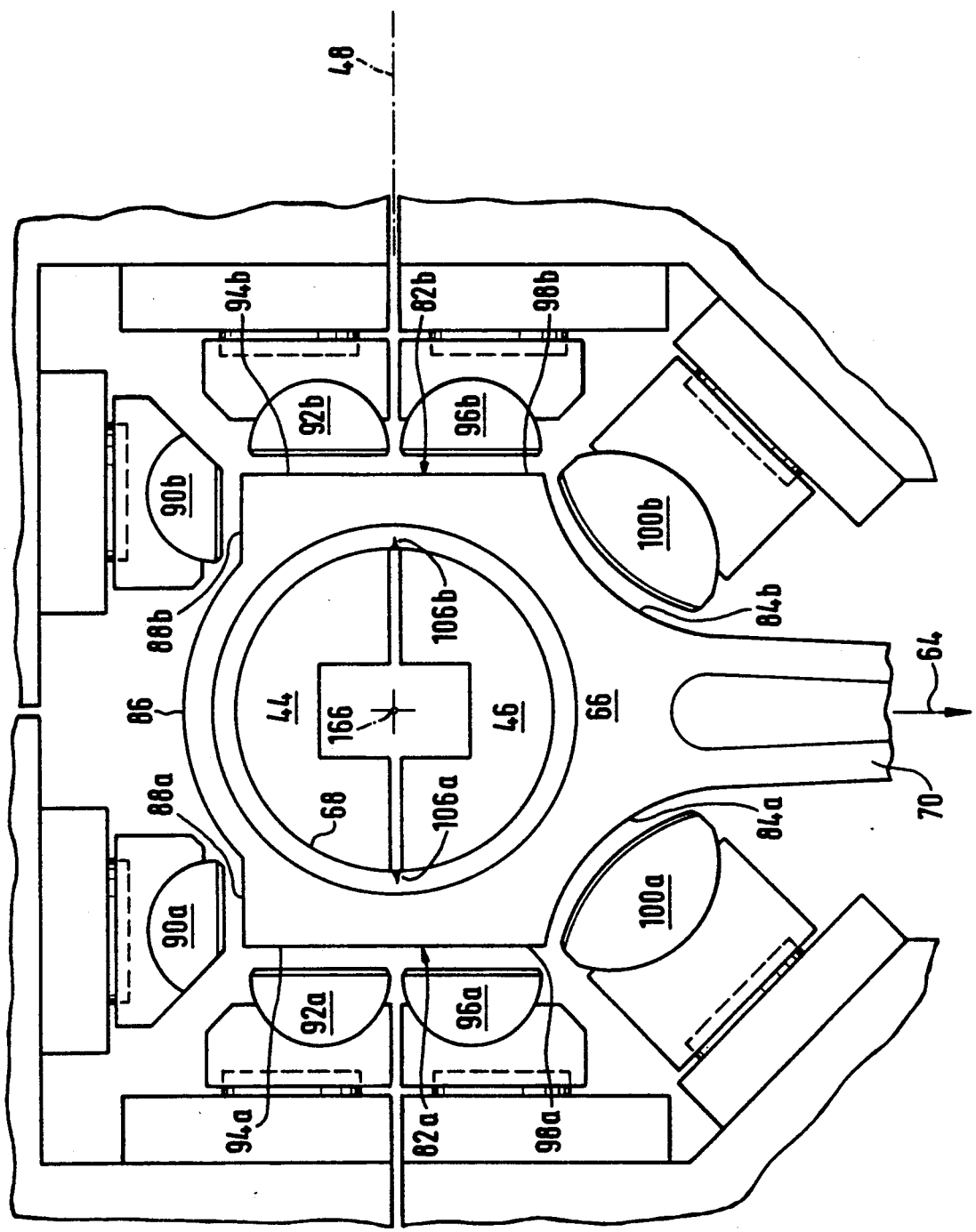

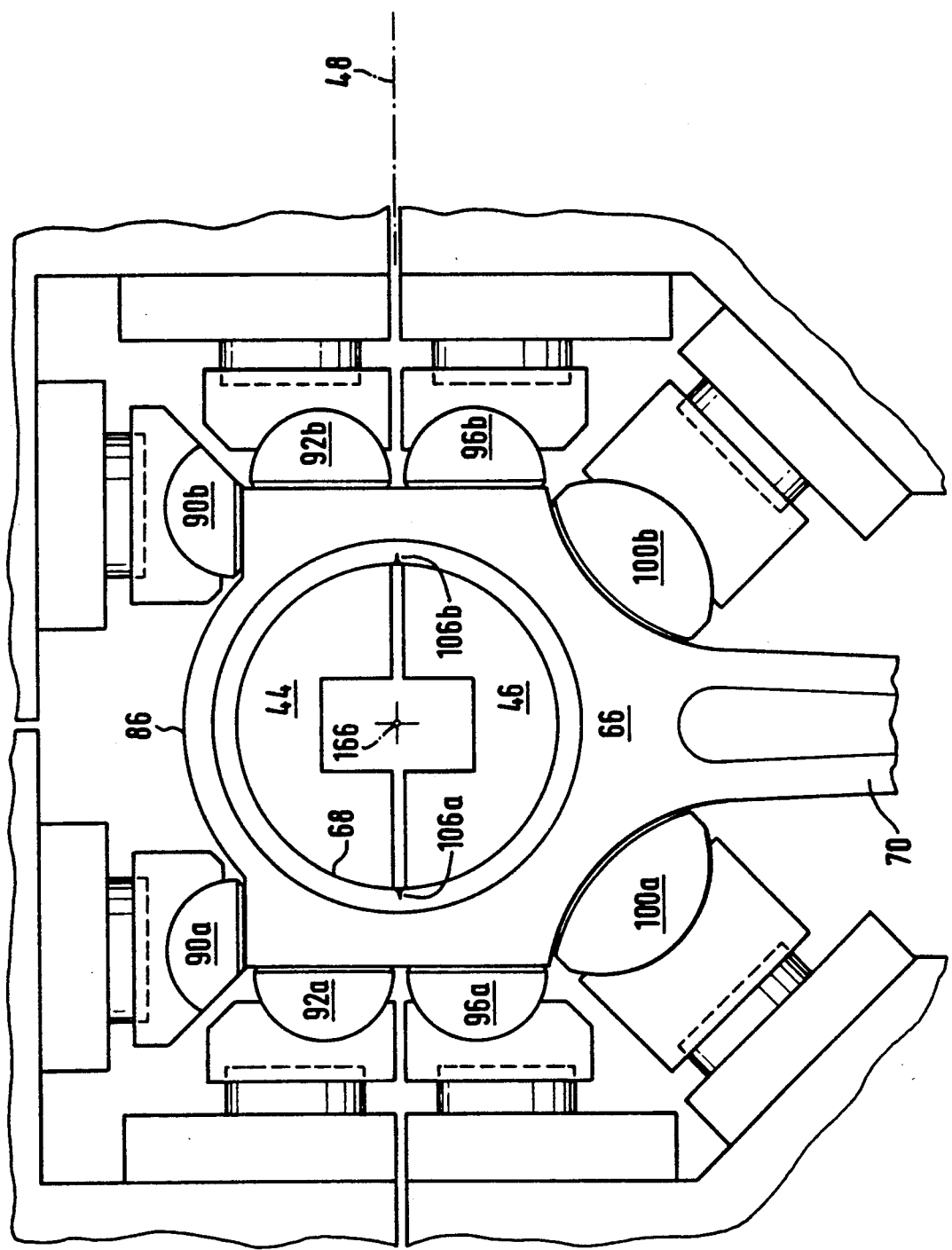

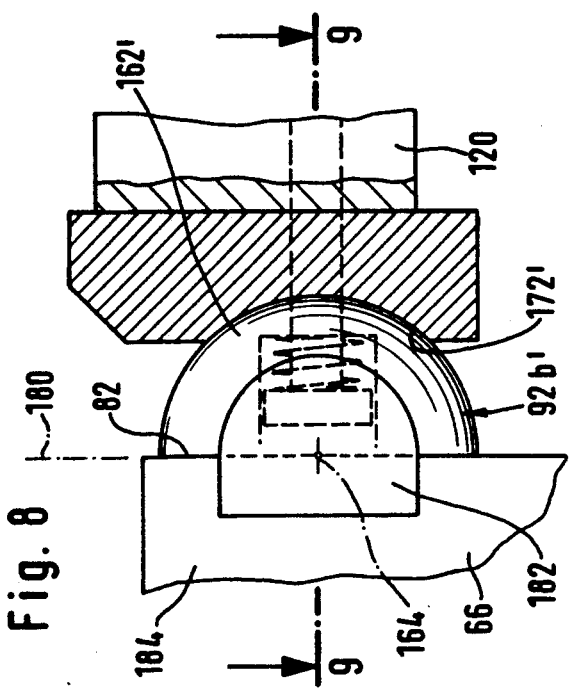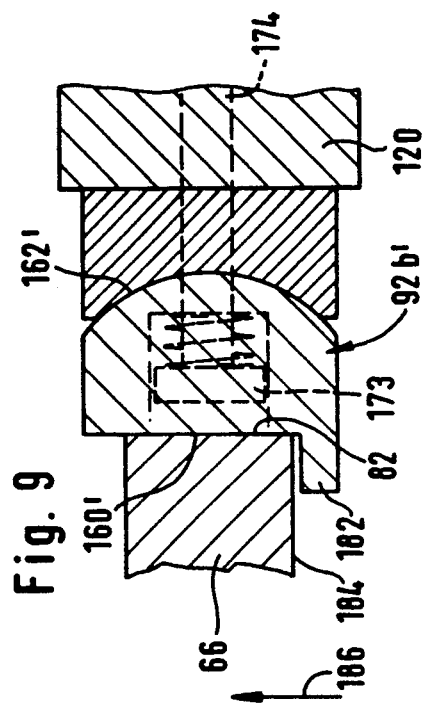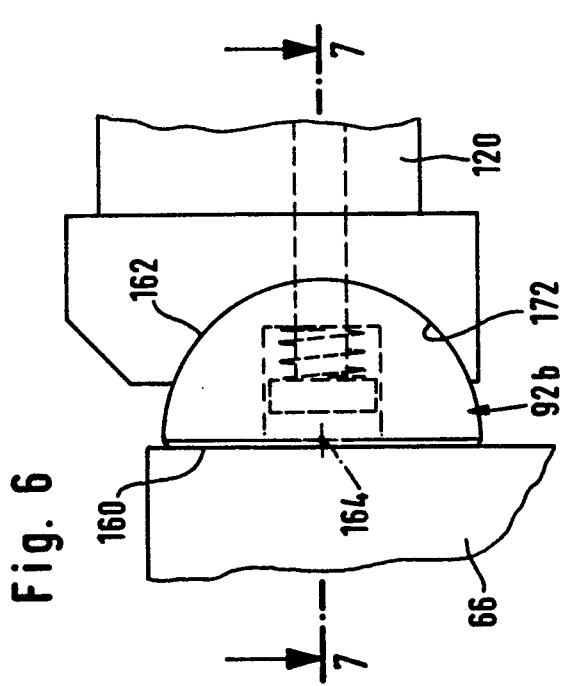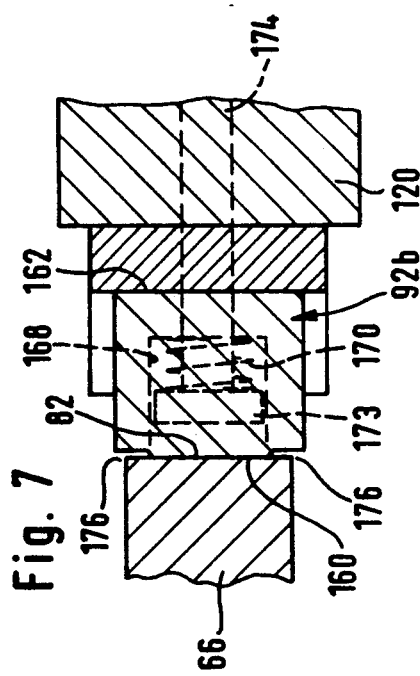

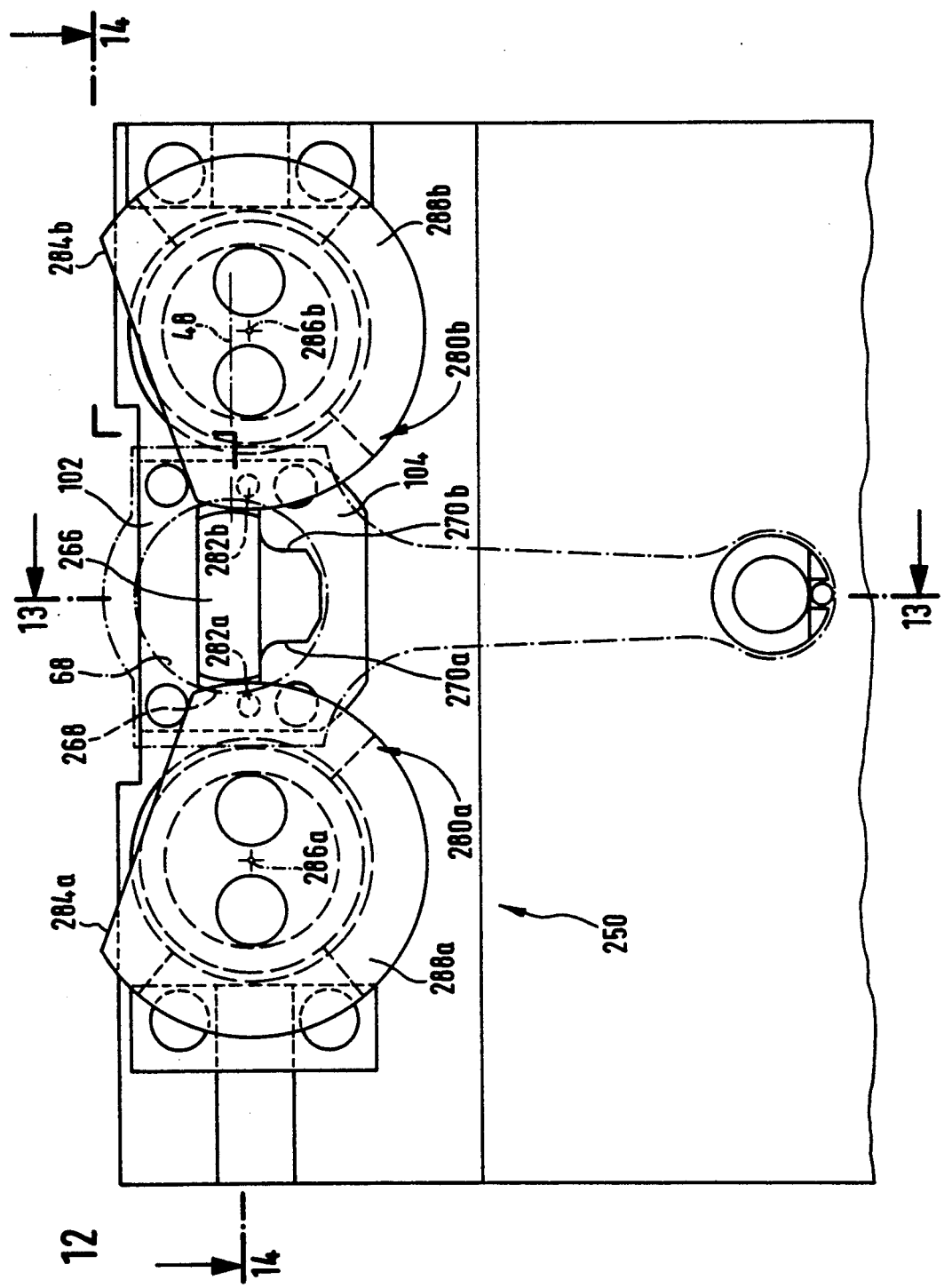

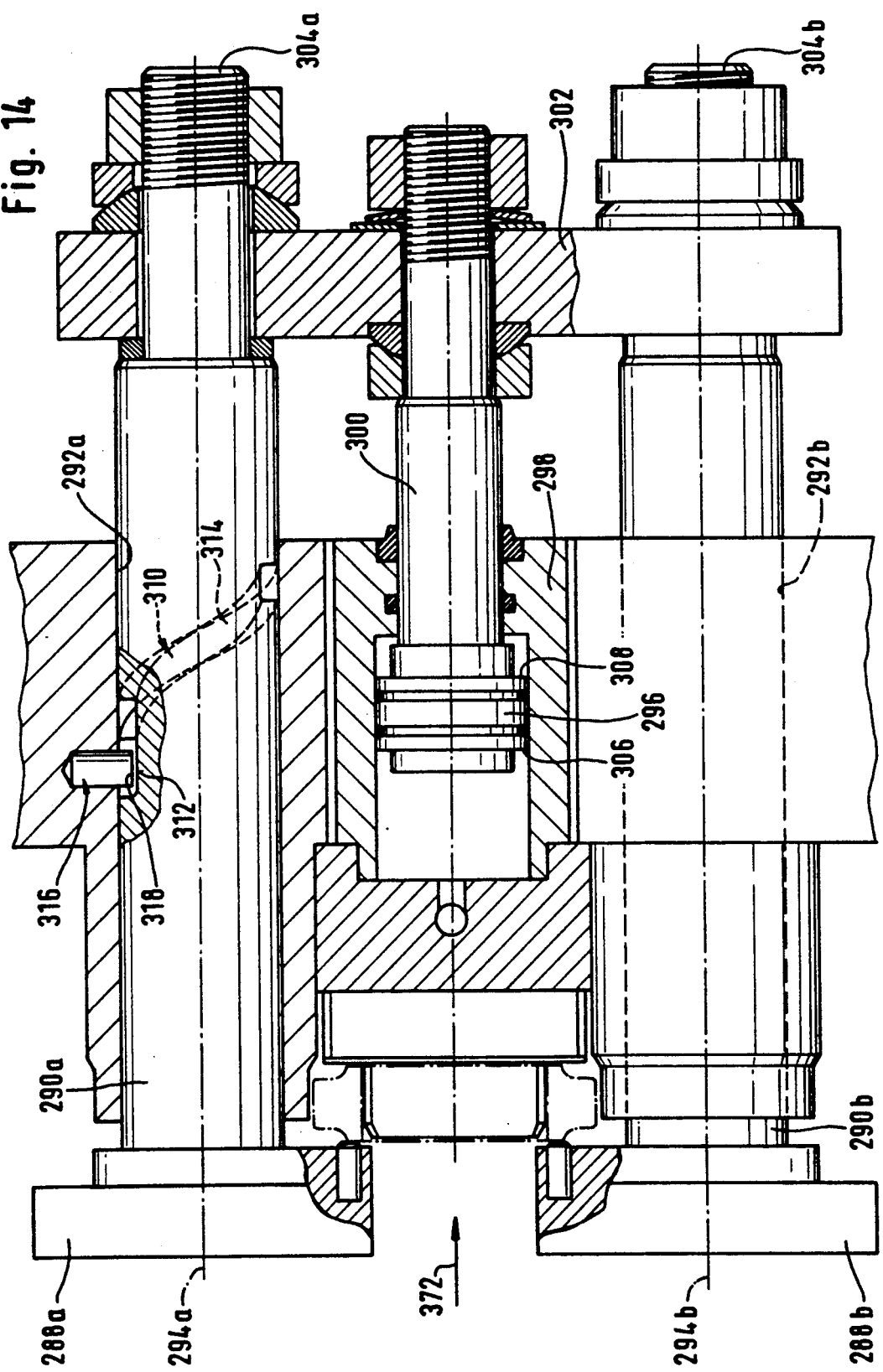

METHOD AND INSTALLATION FOR MACHINING MACHINE PARTS HAVING A BEARING EYE

The invention relates to a machining method including a method for severing a machine part having a bearing eye, in particular a connecting rod, into a first and a second bearing bushing, wherein the machine part with the bearing eye is mounted on a mandrel comprised of two halves and the halves are moved apart to sever the machine part and wherein prior to and during the severing, the first bearing bushing is fixed in the severing direction by at least one first transverse fixing element, the first bearing bushing is fixed transversely to the severing direction by two first side fixing elements, the second bearing bushing is fixed transversely to the severing direction by two second side fixing elements, and the second bearing bushing is fixed in the severing direction by at least one second transverse fixing element, all of the fixing elements being held in a mounting position for mounting the machine part on the mandrel and being moved into their fixing position after the machine part has been mounted.

Such a method is known, for example, from German utility model G 89 05 863.1.

In this method, the transverse and side fixing elements are screws which are advanced towards the workpiece prior to the severing and with which the workpiece is fixed in its position prior to the severing by force being exerted thereon.

The disadvantage of this solution is that the side fixing elements thereby exert a constraint on the machine part in the region of a bearing eye, and the resulting first and second bearing bushings are subjected to constraining forces so that prior to joining, the constraining forces acting on the bearing bushings first have to be eliminated by releasing the fixing elements from the bearing bushings.

The object underlying the invention is, therefore, to so improve a method of the generic kind that the joining following the severing can be carried out in as simple a way as possible.

This object is accomplished in accordance with the invention in a method of the kind described at the beginning by the first and second side fixing elements being positioned prior to the severing in an essentially tension-free manner in the advancing direction against the machine part and being held in this position resting essentially tension-free in the advancing direction against further movement in the direction opposite to the advancing direction during the severing and, in particular during the severing, not fixing deformations of the machine part in the advancing direction, but permitting these to form back.

The advantage of the invention is to be seen in the fact that by positioning the first and second side fixing elements prior to the severing, these rest essentially tension-free in the advancing direction, i.e., after positioning of the side fixing elements in the advancing direction, these essentially do not act additionally with a force on the machine part in a region of the bearing eye and do also not follow a deformation in the region of the bearing eye by a further movement in the advancing direction and maintain this, but only keep the machine part fixed to an adequate extent during the severing so that deformations occurring during the formation of the first and second bearing bushings by the severing are not maintained—as would be the case with side fixing elements exerting a force in the advancing direction—but can form back after the severing. Hence after the severing, the first and second bearing bushings are fixed and aligned relative to one another in a position which permits problem-free joining of severed surfaces produced between the two bearing bushings by the severing.

In the description of the embodiment of the inventive solution hereinabove, no details were given as to how the transverse fixing elements are to be held in place against the machine part in the region of the bearing eye prior to and during the severing. As mentioned previously, firstly the positioning of the first and second side fixing elements in accordance with the invention is essential, and the transverse fixing elements could be positioned with tension in the advancing direction against the machine part in the conventional manner. However, it is more advantageous for the first and second transverse fixing elements to be positioned prior to and during the severing essentially tension-free in the advancing direction against the machine part and to be held during the severing in this position against further movement in the direction opposite to the advancing direction. Hence any constraint exerted by the transverse fixing elements on the bearing bushings during their formation is avoided in the same way as described hereinabove in connection with the side fixing elements.

Joining of the severed bearing bushings can be achieved in a particularly simple way by the inventive solution by the halves of the mandrel being moved together after the severing to join the first and second bearing bushings and by the first transverse fixing element being moved from its fixing position in the direction of its mounting position away from the machine part for joining purposes, while at least the first side fixing elements continue to be held against the machine part in their position in which prior to and during the severing they rest against the machine part essentially tension-free in the advancing direction. Joining is thereby achieved in a particularly simple way, namely by making use of the fact that the side fixing elements do not exert any constraint on the two bearing bushings and by the moving of the first transverse fixing element away from the machine part, play is created for the first bearing bushing to evade further movement of the second bearing bushing after joining of the severed surfaces between the first and second bearing bushings so that at the end of the joining, the two bearing bushings are seated in the joined state and without tension on one another.

In order to hold the second bearing bushing in the fixed position for joining purposes, provision is preferably made for the second transverse fixing element to continue to be held against the machine part for the joining in its position in which prior to and during the severing it rests essentially tension-free against the machine part. This further simplifies the joining of the second bearing bushing with the first bearing bushing as the second bearing bushing is held in a defined position.

As an alternative or supplement thereto, it is advantageous for the second side fixing elements to be held for the joining against the machine part in their position in which prior to and during the severing they rest essentially tension-free in the advancing direction against the machine part. In particular, the alignment of the second bearing bushing relative to the first bearing bushing is thereby maintained in an optimum way so that the severed surfaces fit into one another.

In the inventive machining method, for further transportation of the machine part with the two bearing bushings after the severing, provision is preferably made for the machine part to be gripped in its joined position by a gripper and transported further.

The invention also relates to a machining installation for machine parts having a bearing eye, comprising a device for severing the machine part having the bearing eye, in particular a connecting rod, into a first and a second bearing bushing, a mandrel comprised of two halves on which the machine part can be mounted with the bearing eye, the halves being movable apart to sever the machine part, a first transverse fixing element for fixing the first bearing bushing in the severing direction, two first side fixing elements for fixing the first bearing bushing transversely to the severing direction, two second side fixing elements for fixing the second bearing bushing transversely to the severing direction and at least one second transverse fixing element for fixing the second bearing bushing in the severing direction, all of the fixing elements being advanceable towards the machine part for fixing purposes when it is mounted on the mandrel.

Such a device, as described at the beginning, is likewise known.

The object underlying the invention mentioned hereinabove is accomplished in accordance with the invention in a machining installation of the above-described kind by the first and second side fixing elements being positionable essentially tension-free in the advancing direction against the machine part prior to the severing by displacement thereof in the advancing direction and being fixable in this position resting essentially tension-free in the advancing direction against further movement in the direction opposite to the advancing direction.

The advantages described hereinabove in conjunction with the inventive method are thereby achieved.

In a particularly advantageous embodiment of the inventive solution, provision is made for the side fixing elements to be held on carriers movable in guides in the advancing direction and for the carriers to be supported via locking wedges in the direction opposite to the advancing direction.

This supporting of the carrier via the locking wedges and the fixing of the carrier against movement in the direction opposite to the advancing direction is achieved in a particularly simple way by the locking wedges being immovably fixable in their direction of displacement. Hence large forces can act via the side fixing elements on the carriers and be absorbed in a structurally simple way by the locking wedges fixed in their direction of displacement.

From a structural standpoint, a solution is particularly preferred in which the locking wedges are seated on slides which are fixable in their direction of displacement by clamping bushes.

Furthermore, it has proven advantageous for the carriers and the locking wedges to be hydraulically movable.

In particular when the machine part is a connecting rod, provision is advantageously made for the side fixing elements to rest against a side surface of the machine part.

In a further advantageous embodiment, provision is made for the side fixing elements to rest against the side surface with a contact surface which extends lengthwise in the severing direction and is narrower parallel to the mandrel axis than the side surface. Such design of the contact surface has the advantage that if the contact surface and the side surface do not extend completely parallel to each other, deformations are avoided in the region of a side edge of the machine part as the lack of parallelism of the two surfaces has a less serious effect when the contact surface is narrower than the side surface.

When the machine part with the bearing eye is mounted on the mandrel, its alignment exhibits slight inaccuracies and, therefore, provision is advantageously made for the side fixing elements to be pivotable about an axis of tilt extending parallel to the mandrel axis. This enables the side fixing elements to adapt to different orientations of the machine part mounted on the mandrel.

In the event that high forces act on the side fixing elements, provision is made for the side fixing elements to rest against the side surface with a contact surface which extends lengthwise in the severing direction and engages over the side surface parallel to the mandrel axis, but in the event that deformations are to be avoided in the region of the side edges, this presupposes that the contact surface be alignable parallel to the side surface of the machine part.

For this purpose, it is particularly expedient for the side fixing elements to be tiltable about an axis of tilt extending parallel to the severing direction and preferably also about an axis of tilt extending parallel to the mandrel axis. The simplest way to achieve this is for the side fixing elements to be mounted with a spherical surface section on the carriers.

After the severing, in order to prevent the first bearing bushing from moving so far that it can no longer be automatically joined to the second bearing bushing, provision is advantageously made for the first side fixing elements to secure the first bearing bushing against movement in the direction opposite to the mounting direction.

In the simplest case, this is implemented by the first side fixing elements having an overlap.

Within the scope of the present invention, it is, furthermore, advantageous for the first transverse fixing element to be positionable essentially free of tension in the advancing direction against the machine part prior to the severing by displacement thereof in the advancing direction and to be fixable in this position resting essentially free of tension in the advancing direction against further movement in the direction opposite to the advancing direction.

Similarly, it is also advantageous for the second transverse fixing element to be positionable essentially tension-free in the advancing direction against the machine part prior to the severing by displacement thereof in the advancing direction and to be fixable in this position resting essentially tension-free in the advancing direction against further movement in the direction opposite to the advancing direction.

It is preferable for the transverse fixing element to likewise be held in the advancing direction on a carrier movable in guides, with the carrier being supported via a locking wedge which is preferably immovably fixable in a direction of displacement, in particular by a clamping bush.

In the solution according to the invention, in particular in order to hold the machine part symmetrically in the region of the bearing eye, it is advantageous to provide two first transverse fixing elements lying symmetrically in relation to the mandrel axis.

As a supplement or alternative to this, it is similarly advantageous to provide two second transverse fixing elements lying symmetrically in relation to the mandrel axis.

Furthermore, the inventive machining method includes a method for transportation of a machine part which has been severed into a first and a second bearing bushing and subsequently joined as a whole, in particular, of a connecting rod.

Such a method has not yet been described in conjunction with the methods known so far.

It is, therefore, an object of the invention to create a simple possibility for further transportation of a severed and subsequently joined machine part within the scope of the inventive machining method.

This object is accomplished in accordance with the invention in a method of the kind mentioned hereinabove by the machine part being gripped by a gripper and by the first bearing bushing being pressed by the gripper against the second bearing bushing during the gripping.

Hence the inventive method is capable of transporting a severed machine part comprised of two bearing bushings without further measures into the machining station.

In the event that the machine part is a connecting rod, it is particularly advantageous for the gripper to grip the piston pin bearing eye.

In the case of a connecting rod, the piston pin bearing eye together with the large bearing eye constitute the only region in which defined dimensions are maintained relative to the large bearing eye as all of the external dimensions of the connecting rod vary in accordance with production, while the dimensions of the piston pin bearing eye and of the large bearing eye and also their relative arrangement always remain within narrow tolerance limits on account of the subsequent machining of the connecting rods.

Therefore, within the scope of the inventive method described hereinabove, it is particularly advantageous for the first bearing bushing to be pressed by the gripper against the second bearing bushing which is fixedly connected to the piston pin bearing eye.

The gripper can press on the first bearing bushing in a variety of different ways. It is particularly expedient, in particular to hold the connecting rod symmetrically and not allow occurrence of transverse forces which could cause the connecting rod to drop out of the gripper, for the first bearing bushing to be pressed approximately at the center thereof by the gripper.

Especially when the connecting rod has to be held and fixed again in the individual machining stations, it is particularly advantageous for the connecting rod to be held in a defined position and transported by the gripper solely for engaging the piston pin bearing eye and pressing against the first bearing bushing.

As a supplement to the machining method described hereinabove, the invention relates to a machining installation comprising a gripper for the machine part with a bearing eye which is divided by severing into a first and a second bearing bushing which are then joined.

The object of transporting this machine part safely and reliably is accomplished in accordance with the invention by the gripper holding the first bearing bushing pressed against the second bearing bushing when gripping the machine part.

In the event that the machine part is a connecting rod with a piston pin bearing eye, the gripper is expediently designed so as to comprise a guide mandrel for engagement in the piston pin bearing eye. The gripper is then able to position the connecting rod with its large bearing eye in a defined position as the piston pin bearing eye and the large bearing eye are arranged in a defined position relative to one another, whereas, for example, an external contour of the connecting rod varies considerably from connecting rod to connecting rod with respect to its dimensions.

Especially for defined positioning of the connecting rod, it is particularly advantageous for the guide mandrel to have a cylinder which fits into the piston pin bearing eye.

To enable the connecting rod to also be fixed in a defined position, for example, in a holding station, provision is advantageously made for the guide mandrel to only extend partially through the piston pin bearing eye. It is particularly expedient for the guide mandrel to extend half-way through the piston pin bearing eye at the most.

To secure the gripping of the connecting rod in the piston pin bearing eye, provision is also expediently made for the gripper to comprise a securing finger with a securing nose for securing the piston pin bearing eye seated on the guide mandrel.

Furthermore, an inventive gripper for a connecting rod with a second bearing bushing fixedly connected to the piston pin bearing eye is advantageously designed so as to comprise a movable gripping finger for acting on the first bearing bushing in the direction of the guide mandrel. The first bearing bushing is thereby pushed against the second bearing bushing and the guide mandrel serves as counter bearing so that, on the one hand, the connecting rod is held with its large bearing eye in a defined position and, on the other hand, the first and second bearing bushings remain in their joined state during the gripping and this joined state is also maintained during transportation.

The gripping finger is preferably designed so as to comprise a holding prism for acting on the first bearing bushing.

The holding prism is preferably of prismatic design in the direction transverse to a guide mandrel axis.

As a supplement to this, it is also advantageous for the holding prism to be prismatic parallel to the guide mandrel axis.

In a particularly preferred embodiment, provision is made for the holding prism to act on a center arc of the first bearing bushing.

To create the additional possibility, in particular for positioning the connecting rod in certain machining stations, of holding the connecting rod therein, provision is made for the gripper to comprise an ejector.

The invention also relates to a machining installation including a holding station for a machine part divided by severing into a first bearing bushing and a second bearing bushing, with the first and second bearing bushings seated in the joined state on one another.

In such a holding station, there is the problem of precisely fixing the machine part for machining.

This object is accomplished in accordance with the invention in a holding station of the kind mentioned hereinabove by the holding station having a centering means which engages the bearing eye.

The centering means is preferably designed so as to fix both bearing bushings.

Especially with a machine part in the form of a connecting rod in which one bearing bushing is fixedly connected to a piston pin bearing eye, it is particularly advantageous for the holding station to comprise a fixing mandrel which engages the piston pin bearing eye as the large bearing eve is thereby fixable, in particular in connection with the centering means, in a defined position.

To also ensure defined arrangement of the machine part in this holding station, provision is preferably made for the holding station to comprise a rear stop surface extending transversely to the insert direction for one of the bearing bushings.

The holding station is expediently designed so as to comprise movable holding jaws with which the bearing bushing resting against the rear stop surface can be acted upon against the latter.

In a particularly preferred embodiment, provision is preferably made for the bearing bushing which is not acted upon and thereby made to rest against the rear stop surface to be guided with slight play against movement in the insert direction and in the direction opposite thereto. This makes it possible, for example, in this holding station, for the two bearing bushings to be released so that the severed surfaces are no longer acted upon by pressure and so, for example, the severed surfaces can be lifted off one another again and joined again, thereby making it possible for the severed surfaces to be fitted together again.

Further features and advantages of the inventive solution are set forth in the following description and the appended drawings of several embodiments.

The drawings show:

FIG. 1 a plan view of an inventive machining installation;

FIG. 2 a front view of an inventive severing device;

FIG. 3 a section-wise enlarged illustration of a clamped connecting rod in the inventive severing device according to FIG. 2;

FIGS. 4A to D a further enlarged illustration of the means for holding the connecting rod according to FIG. 3 on a mandrel, wherein FIG. 4A shows the connecting rod mounted on the mandrel and the mandrel halves moved apart, with jaws for fixing the connecting rod standing in the mounting position;

FIG. 4B shows an illustration similar to FIG. 4A with jaws moved into the fixing position;

Figure 3:
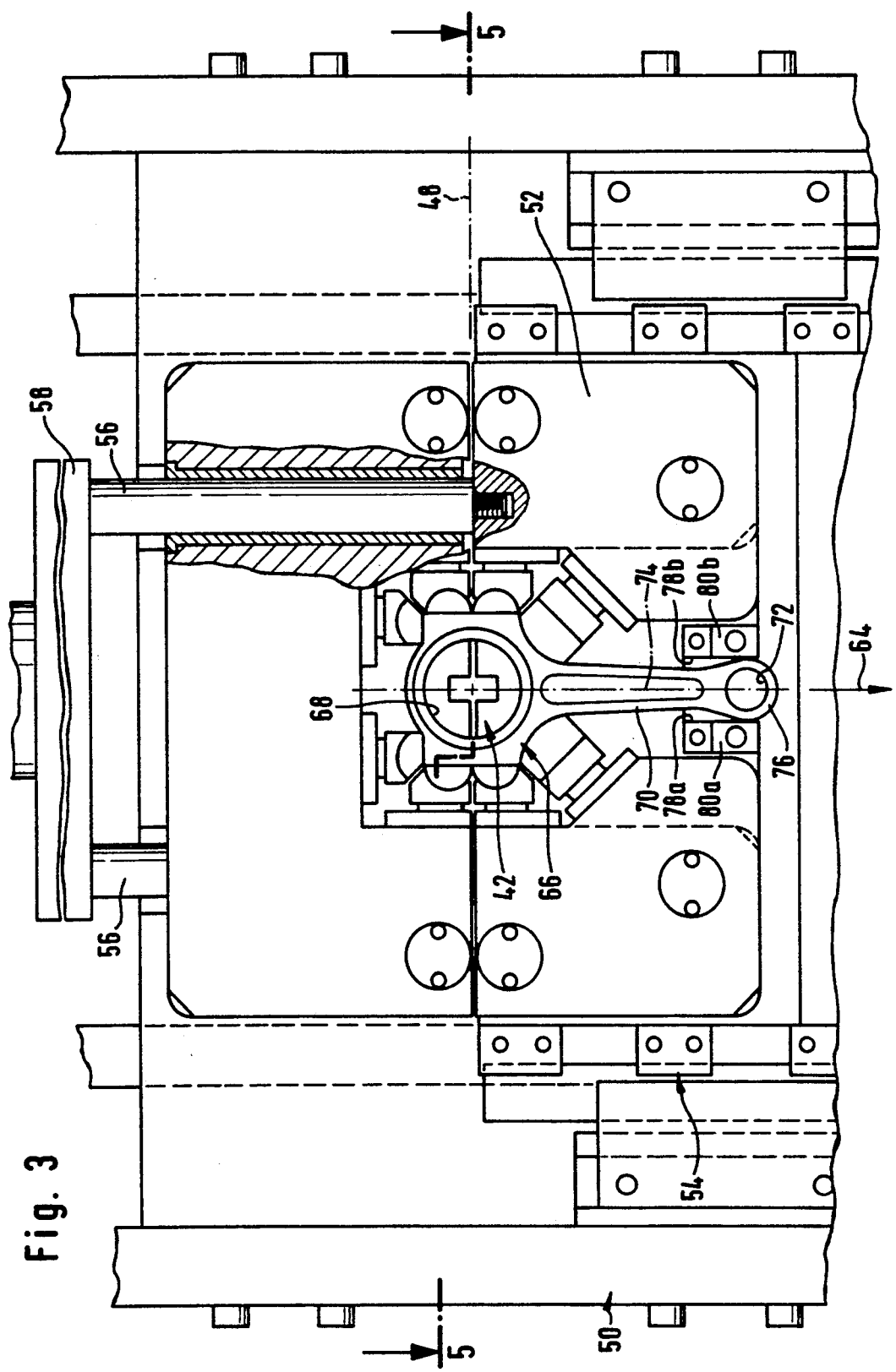
Figure 5:
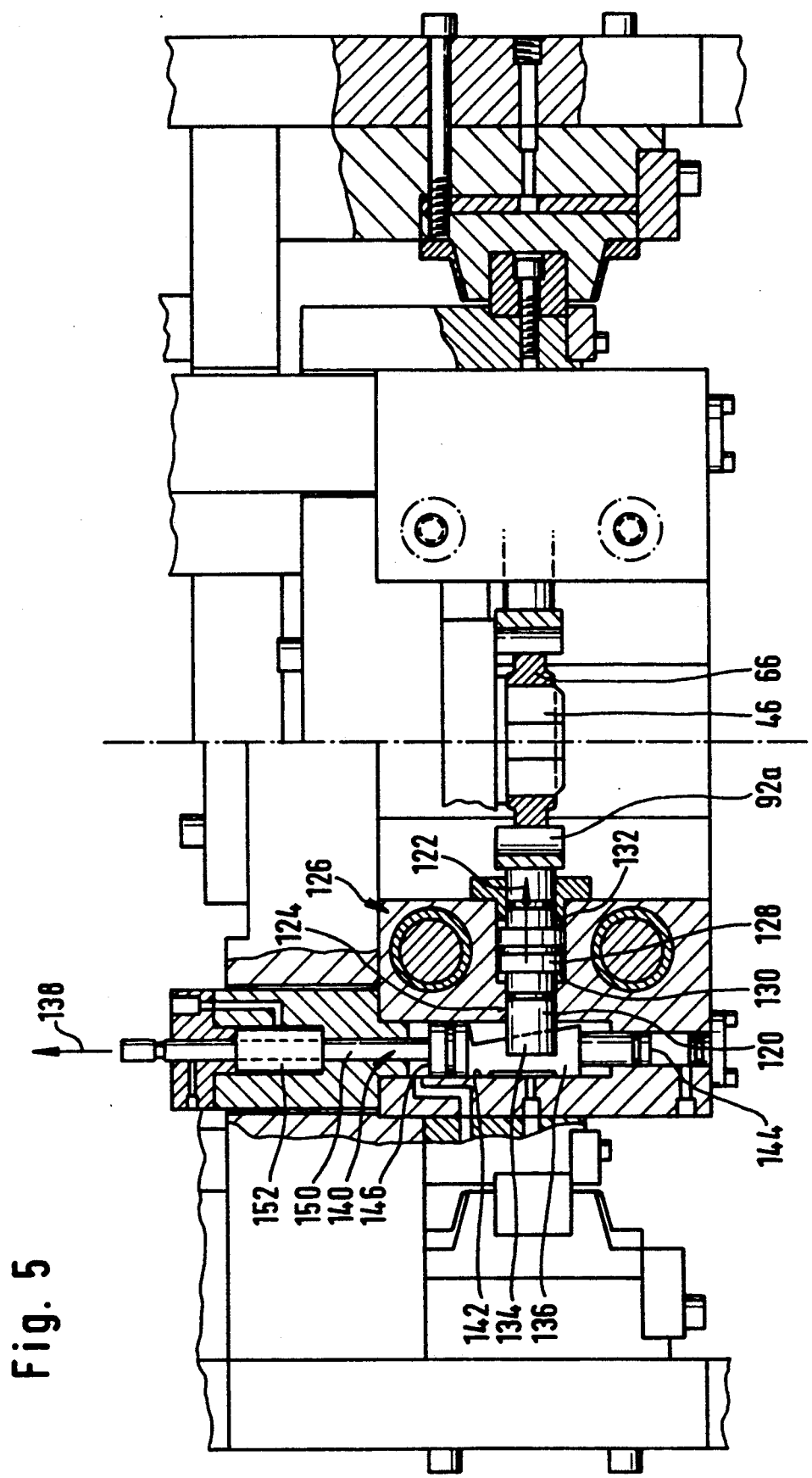
Figures 10, 11:
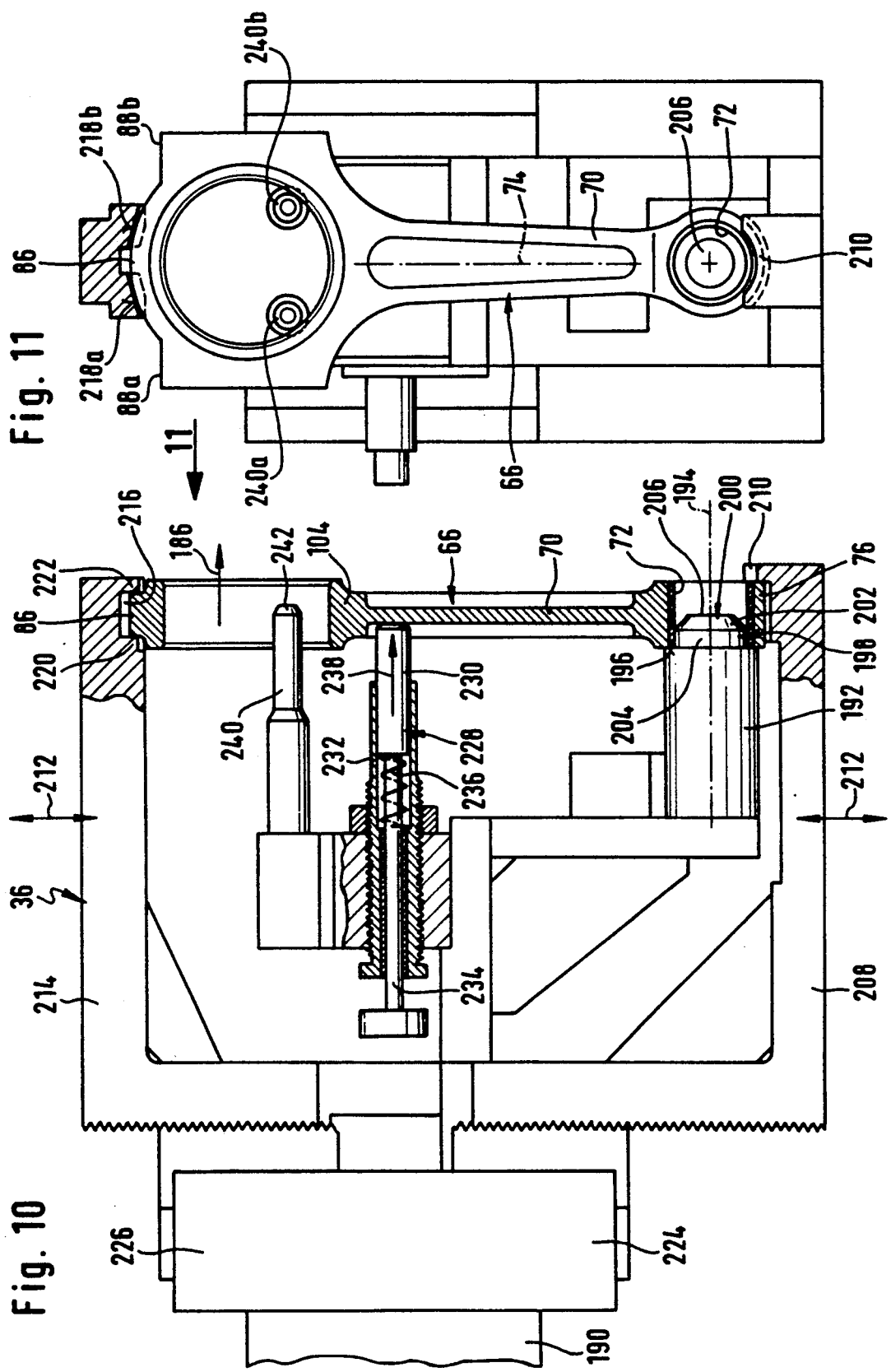
Figure 13:
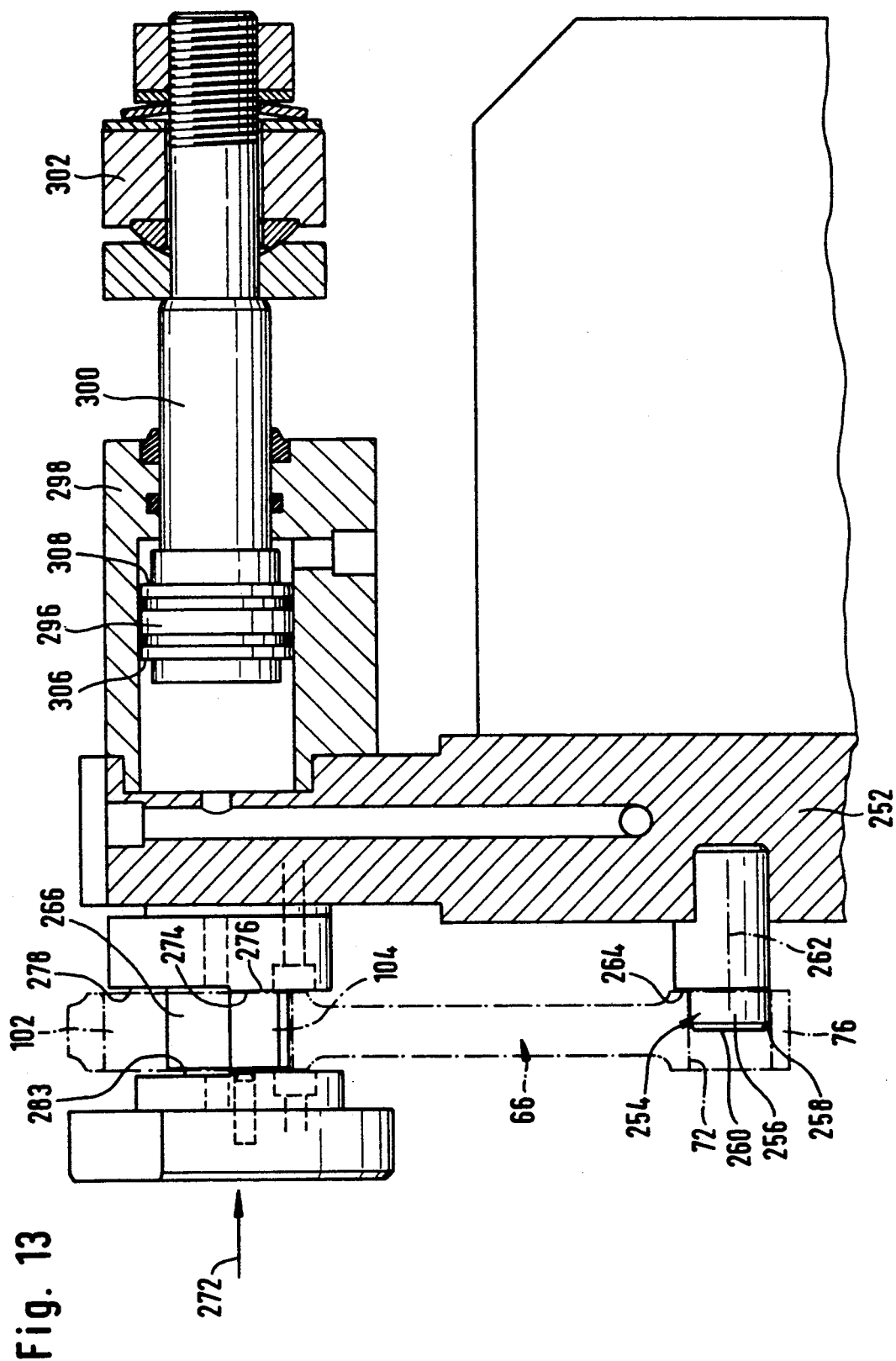

FIG. 5 a section along line 5—5 in FIG. 3;

FIG. 6 a section-wise plan view of a side fixing jaw;

FIG. 7 a section along line 7—7 in FIG. 6;

FIG. 8 a variant of a side fixing jaw;

FIG. 9 a section along line 9—9 in FIG. 8;

FIG. 10 a partly sectional side view of a gripper;

FIG. 11 a plan view in the direction of arrow 11 in FIG. 10;

FIG. 12 a plan view from the front of an inventive holding station;

FIG. 13 a section along line 13—13 in FIG. 12; and

FIG. 14 a section along line 14—14 in FIG. 12.

An embodiment, designated in its entirety 10, of a machining installation for severing machine parts in the area of a bearing eye comprises a severing device 12 with a severing station 14 in which severing of, for example, connecting rods is carried out in the area of the large bearing eye thereof.

The severing device 12 is followed by further machining devices 16, 18 and 20 which, in turn, comprise further machining stations 22, 24 and 26 in which the severed connecting rods are, for example, screwed, opened and cleaned, screwed again and measured.

The severing station 14 and the further machining stations 22, 24 and 26 are arranged at equal spacings from one another in a clocking direction 28.

The connecting rods are transported between the severing station 14 and the further machining stations 16, 18 and 20 by grippers 32, 34, 36, 38 and 40 arranged on a gripper carrier 30. To gain access to the severing station 14 and the further machining stations 22, 24 and 26, the grippers are movable perpendicular to the clocking direction and also in the clocking direction 28 through the constant distance between the individual stations 14, 22, 24 and 26 for transportation from one station to the next.

All of the grippers 32 to 40 are preferably arranged on the common gripper carrier 30 and the gripper carrier 30 is movable either perpendicular to the clocking direction 28 or in the clocking direction 28 so that the connecting rods are simultaneously gripped in the individual stations 14, 22, 24 and 26, simultaneously removed from these stations, simultaneously transported further in the clocking direction 28 and simultaneously inserted in the next station.

Figure 1:
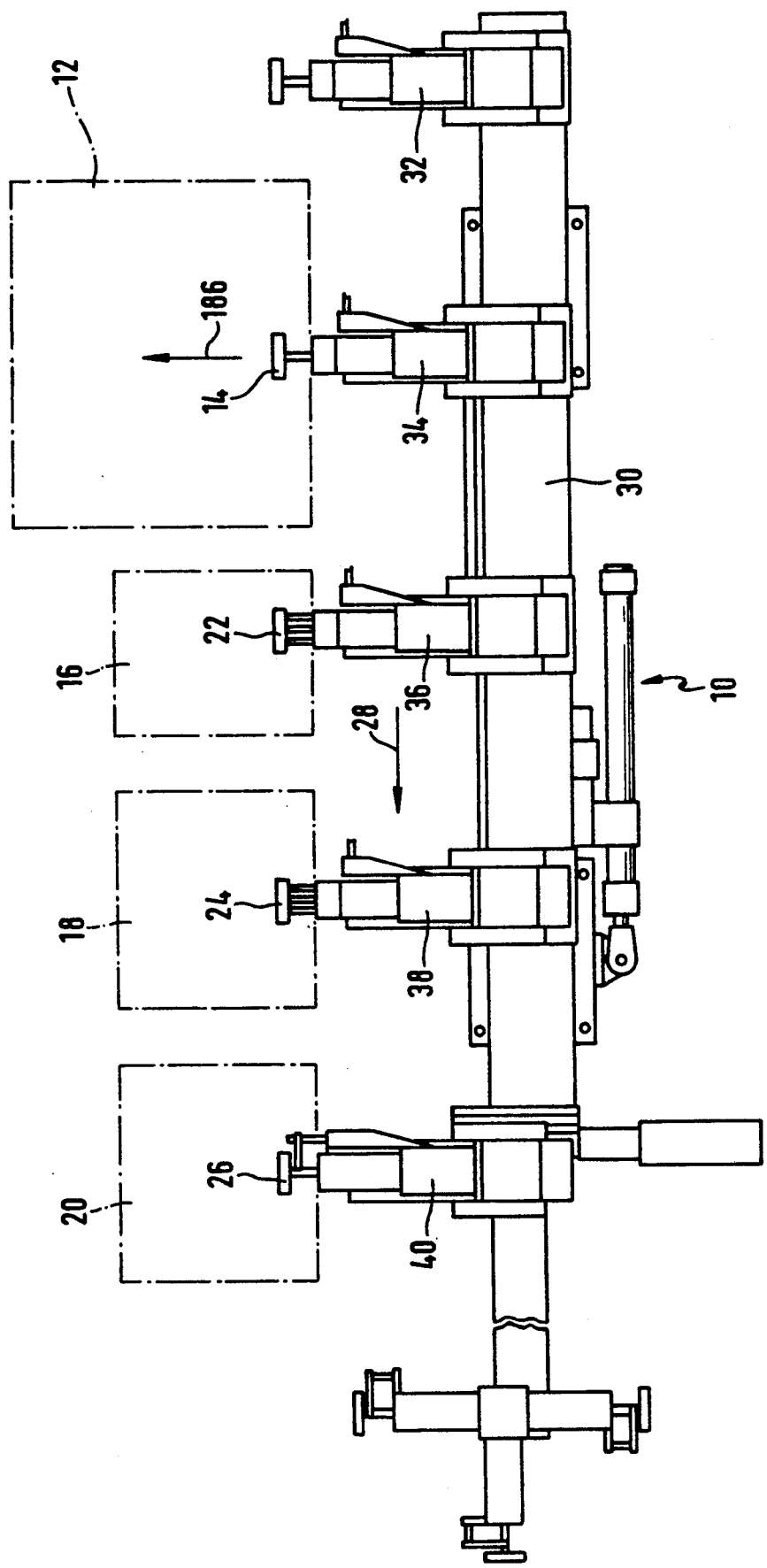
Figure 2:
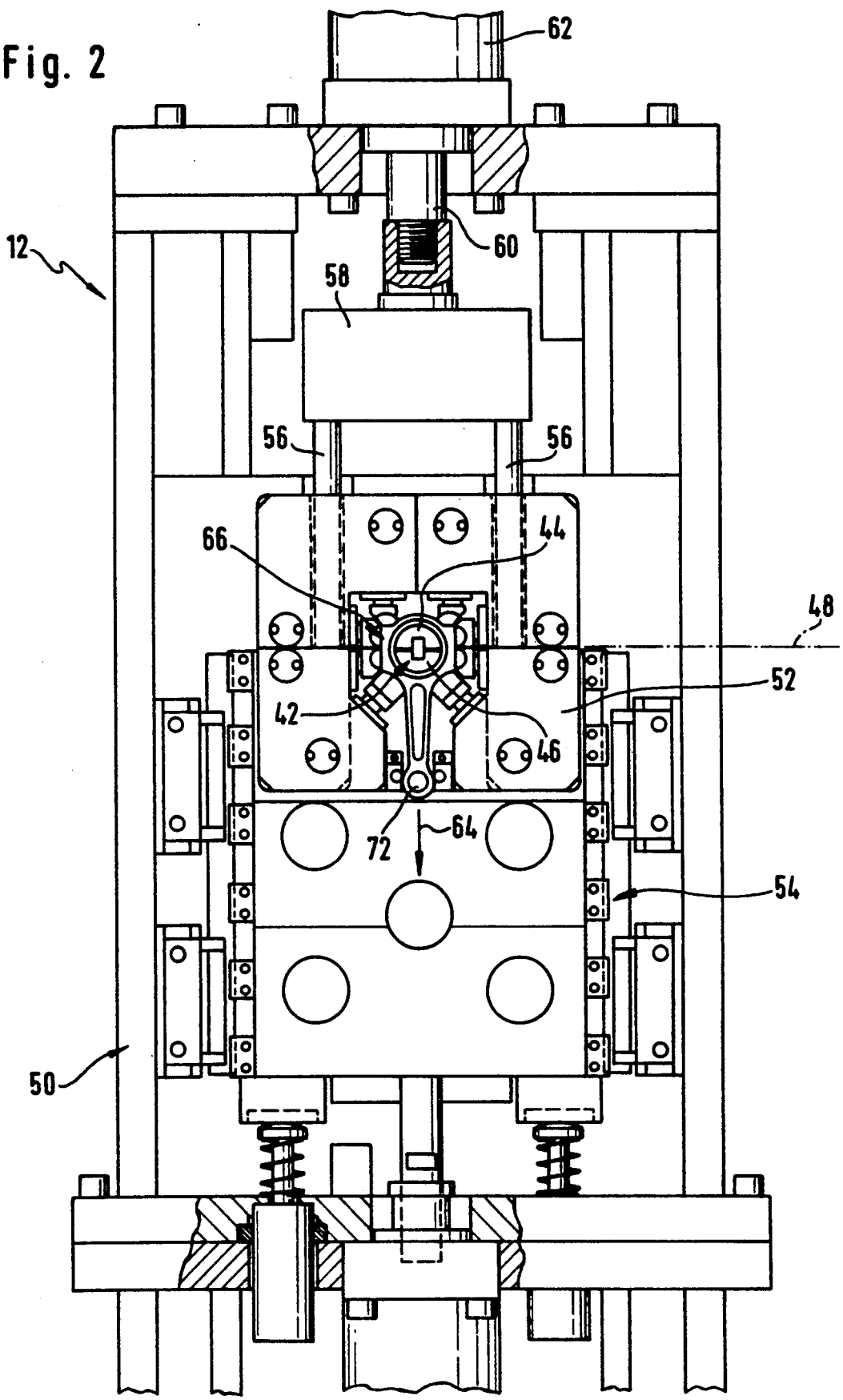

As shown in detail in FIG. 2, this severing device 12 comprises a mandrel 42 which is divided into a first half 44 and a second half 46 by a severing plane 48 which, for example, in the embodiment illustrated in FIG. 1 extends horizontally. The first half 44 of the mandrel 42 is fixedly connected to a frame 50 of the severing device 12 while the second half 46 of the mandrel 42 is firmly seated on a slide 52 displaceable relative to the frame 50.

This displaceable slide 52 is guided via linear guides 54 on both sides on the frame 50.

The slide 52 is moved via a total of four pressure rods 56 arranged in pairs symmetrically in relation to the mandrel 42. The pressure rods 56 are guided from the slide 52 to a bridge 58 which is arranged above the mandrel 42. This bridge 58 is connected to a piston rod 60 of a pressure cylinder 62 fixedly mounted on the frame 50 and is movable in a severing direction 64 to sever a connecting rod 66 seated on the mandrel 42 so that via the pressure rods 56, the slide 52 likewise moves in the severing direction 64 and the second half 46 of the mandrel 42 moves with this slide 52 away from the first half 44.

The connecting rod 66 is thereby severed in the severing plane 48.

As illustrated on an enlarged scale in FIG. 3, the connecting rod 66 is seated for severing with its large bearing eye 68 on the mandrel 42 and extends with its rod part 70 away from the large bearing eye 68 to a piston pin bearing eye 72. The rod part 70 of the connecting rod 66 extends with its longitudinal direction 74 parallel to the severing direction 64, in the embodiment of the severing device 12 illustrated in FIGS. 2 and 3, preferably in the vertical direction downwards. To fix the connecting rod 66 against rotation on the mandrel 42, an end 76 of the rod part 70 surrounding the piston pin bearing eye 72 lies between two holding surfaces 78a and 78b which enclose the end 76 between them and, in turn, are carried on holding blocks 80a and 80b seated on the slide 52.

For severing, as illustrated in FIGS. 4A to D, the connecting rod is fixed in the area of the bearing eye 68 on two opposed side surfaces 82a and 82b preferably extending parallel to the severing direction 64, two transverse arcs 84a and 84b extending from the side surfaces 82a and 82b to the rod part 70, and two outer transverse surfaces 88a and 88b located opposite the transverse arcs and on either side of a center arc 86.

This fixing is carried out, as illustrated in FIG. 4B, by first transverse jaws 90a and 90b which are positionable against the outer transverse surfaces 88a and 88b, first side fixing jaws 92a and 92b which are positionable against the side surfaces 82a and 82b in an upper area 94a and 94b, second side fixing jaws 96a and 96b which are positionable against the side surfaces 82a and 82b in a lower area 98a and 98b and by second transverse jaws 100a and 100b which are positionable against the transverse arcs 84a and 84b.

The transverse jaws 90 and 100 and the side fixing jaws 92 and 96 are movable from a mounting position for the connecting rod 66, illustrated in FIG. 4A, in which they are spaced from the transverse surfaces 88, the side surfaces 82 and the transverse arcs 84 in an advancing direction towards the connecting rod 66 into a fixing position, illustrated in FIG. 4B, in which the transverse jaws 90 and 100 and the side fixing jaws 92 and 96 rest against the transverse surfaces 88, the transverse arcs 84 and the side surfaces 82 and fix the connecting rod 66 in the area of the bearing eye 68.

To fix the connecting rod 66, in particular, during the severing, the first transverse jaws 90 and the first side fixing jaws 92 are fixedly arranged on the frame in the same way as the first half 44 of the mandrel 42, while the second side fixing jaws 96 and the second transverse jaws 100 are seated on the slide 52 and move jointly with the second half 46 of the mandrel 42 so that a first bearing bushing 102 resulting from the severing and a second bearing bushing 104 also resulting therefrom remain aligned in the same direction in relation to each other as when the connecting rod 66 was not yet severed.

During the severing, the connecting rod 66 is severed in the area of the large bearing eye 68 in the severing plane 48 which is predetermined on the connecting rod 66 by two notches 106a and 106b throughout the entire connecting rod 66 so that during the severing, upper severed surfaces 108a and 108b and lower severed surfaces 110a and 110b starting from the notches 106a and 106b are formed and stand in spaced relation to one another when the halves 44 and 46 of the mandrel 42 are moved apart.

After the severing of the connecting rod 66 and the dividing thereof into the first bearing bushing 102 and the second bearing bushing 104 on which the rod part 70 remains integrally formed with the piston pin bearing eye, the second bearing bushing 104 is joined to the first bearing bushing 102 by driving the second half 46 of the mandrel 42 back so far that the facing surfaces 112 and 114 of the halves 44 and 46, respectively, rest against one another. The first bearing bushing 102 is thereby pushed slightly upwards. To enable this, when the second half 46 is brought up to the first half 44, the first transverse jaws 90a and b are driven back into their mounting position so that the first bearing bushing 102 can be moved slightly in a joining direction 116 which is exactly opposite to the severing direction 64. The first bearing bushing 102 and the second bearing bushing 104 are thereby joined together in the area of their severed surfaces 108 and 110 so that the severed surfaces 108 and 110 fit onto one another again and the bearing eye 68 resumes it original shape.

To enable such matched joining of the first bearing bushing 102 and the second bearing bushing 104 resulting from the severing, the transverse saws 90 and 100 and the side fixing jaws 92 and 96 are positioned prior to the severing against the transverse surfaces 88, the transverse arcs 84 and the side surfaces 94 and 82 and fixed in this position, in particular fixed such that in the event of deformation of the bearing bushings 102 and 104 during the severing, these do not move further in their advancing direction.

For this reason, as explained by way of example with reference to the side fixing jaw 92a in FIG. 5, each of the transverse jaws 90 and 100 and the side fixing jaws 92 and 96 is held on a carrier 120 for displacement in its advancing direction 122. This carrier is mounted for guidance in the advancing direction 122 in a carrier bore 124 of a carrier holder 126 and forms a carrier piston 128 with a first piston surface 130 and a second piston surface 132. The first carrier piston surface 130 or the second carrier piston surface 132 can be selectively acted upon with hydraulic medium in order to displace the carrier either in the advancing direction 122 or in the direction opposite to the advancing direction 122 relative to the carrier holder.

At its rear end 134 opposite the respective jaw, in this case the side fixing jaw 92a, the carrier 120 is supported via a locking wedge 136 which is part of a slide 140 which is movable in a direction of displacement 138 perpendicular to the advancing direction 122 and is likewise mounted in the carrier holder 126. This slide 140 also lies in a slide channel 142 in the carrier holder 126 and forms a first piston surface 144 and a second piston surface 146 which can likewise be acted upon with hydraulic medium. When the first piston surface 144 is acted upon with hydraulic medium, the slide 140 moves with the locking wedge 136 in the direction of displacement 138 until the locking wedge 136 supports the end 134 of the carrier 120 and hence fixes the carrier 120 against movement in the direction opposite to the advancing direction 122, whereas when the second piston surface 146 is acted upon with hydraulic medium, the slide 140 moves together with the locking wedge 136 in the direction opposite to the direction of displacement 138 and releases the end 134 of the carrier 120 for movement in the direction opposite to the advancing direction 122.

The slide 140 also comprises a slide rod 150 which is guided through a clamping bush 152. When the clamping bush 152 is acted upon with hydraulic medium in the radial direction, the slide rod 150 is fixable with the clamping bush 152 against any displacement in the direction of displacement 138 or in the direction opposite to this.

The positioning of each of the jaws, in the case of FIG. 5 the side fixing jaw 92a, is carried out starting from the mounting position by the first carrier piston surface 130 being acted upon for placement of the side fixing jaw 92a against the side surface 82a of the connecting rod 66. By the first piston surface 144 being acted upon, the slide 140 is then moved together with the locking wedge 136 in the direction of displacement 138 until the locking wedge 136 supports and fixes the end 134 of the carrier 120 against displacement in the advancing direction 122. In this position, by the clamping bush 152 being acted upon by pressure in the radial direction, the slide rod 150 is fixed in the clamping bush 152 and hence relative to the carrier holder 126 against displacement in the direction of displacement 138 or in the opposite direction, after which the pressure applied to the carrier piston 128 and the slide 140 in the area of their piston surfaces is switched off.

The side fixing jaw 92a is thereby held in a tension-free manner against the side surface 82a but does not move in the event of deformation of the side surface 82a, for example, in the direction of the first half 44 of the mandrel 42, in the direction of the latter but merely prevents movement of the side surface 82a in the direction opposite to the advancing direction 122.

To move the side fixing jaw 92a back, the clamping bush 152 is first released and the second piston surface 146 of the slide 140 is then acted upon by pressure so that the locking wedge 136 is moved away from its abutment on the end 134 of the carrier 120 in the direction opposite to the direction of displacement 138, and the carrier 120 can then be moved in the direction opposite to the advancing direction 122 by the second carrier piston surface 132 being acted upon.

As illustrated, in particular, in FIG. 4 and, by way of example, with the side fixing jaw 92b in FIGS. 6 and 7, the transverse jaws 90 and 100 and the side fixing jaws 92 and 96 have a flat contact surface 160 for abutment on the connecting rod 66 and a supporting surface 162 arched in the shape of a semicircle for supporting them on the carrier 120. In the embodiment illustrated in FIGS. 4 and 6 and in FIG. 7, the supporting surface 162 is a cylinder surface with a cylinder axis 164 extending parallel to a mandrel axis 166 of the mandrel 42. The transverse jaws 90 and 100 and the side fixing jaws 92 and 96 can thereby be tilted with a contact surface 160 aligned parallel to the mandrel axis 166 and thus adapt to different rotary angular positions of the connecting rod 66 on the mandrel 42.

As illustrated in FIG. 7, the side fixing jaw 92b and in like manner the transverse jaws 90 and 100 as well as all of the other side fixing jaws 92 and 96 are held with a compression spring 170 arranged in a recess 168 in a counterbearing surface 172 on the carrier 120 which likewise has the shape of a cylinder surface adapted to the supporting surface 162. The compression spring 170 is supported on a head 173 of a bolt 174 screwed into the carrier 120. The head 173 likewise lies in the recess 168 of the side fixing jaw 92b and the bolt 174 is screwed into the carrier 120 so as to extend through the supporting surface 162.

In the case of the side fixing jaw illustrated in FIGS. 4, 6 and 7, the contact surface 160 has a lesser extent in the direction of the mandrel axis 166 than the side surface 82 of the connecting rod so that the connecting rod 66 is only fixed in an inner area of the side surface 82. This has the advantage that when the side surface 82 does not extend parallel to the mandrel axis 166 the force acts only in the inner area of the side surface 92 on the side surface 82 where a non-parallel alignment between the side surface 82 and the contact surface 160 has less effect than if the contact surface 160 extended over the entire extent of the side surface 82 in the direction of the mandrel axis 166. In the latter, the introduction of a force would result in deformation in the area of a side edge 176 of the connecting rod 66 and thus in inexact alignment of the bearing bushings 102 and 104 after the severing.

An alternative to the mounting of the transverse jaws 90 and 100 and the side fixing jaws 92 and 96 described hereinabove is likewise shown by way of example in a side fixing jaw 92b'.

In this embodiment, the side fixing jaw 92b' is not only rotatable about the axis 164 but also about an axis 180 extending perpendicular to the axis 164 and essentially parallel to the side surface 82 of the connecting rod 66. Hence the supporting surface 162' no longer has a cylindrical shape but instead two arches, namely one around the axis 164 and one around the axis 180 and in the simplest case a section of a spherical surface. In the same way, the counterbearing surface 172' is adapted to the supporting surface 162'.

With such design of the supporting surface 162' and the counterbearing surface 172', it was made possible for the contact surface 160' to adapt to both a twisted position of the connecting rod 66 on the mandrel 42 and non-parallel alignment of the side surface 82 with the mandrel axis 166 and hence the contact surface 160' can expediently rest throughout the entire width against the side surface 82 without having to fear deformation in the area of the side edges 176 of the connecting rod 66. Such contact of the contact surface 160' and the side surface 82 over the entire surface makes it possible to reduce the surface pressure and hence fix the connecting rod 66 even better.

The side fixing jaw 92b' is also provided with an overlap 182 which extends slightly over a front surface 184 of the connecting rod 66 mounted on the mandrel 42 that faces away from the frame 50 of the severing device 12 and thus represents a means for securing the bearing bushings 102 and 104 resulting from the severing against movement outwards in the direction opposite to a mounting direction 186.

As additional measure, it is similarly conceivable to also provide an overlap 182 on the side of the connecting rod opposite the front face.

As explained previously in conjunction with FIG. 1, the inventive machining installation 10 is provided with a plurality of grippers 32 to 40 for mounting the connecting rod 66 on the mandrel 42. These grippers 32 to 40 are of identical design with respect to their main features. These will be explained with reference to the gripper 36 in FIGS. 10 and 11.

The gripper 36 comprises a gripper frame 190 seated on the gripper carrier 30. Fixedly connected to this gripper frame 90 is a guide mandrel 192 having at its front end a ring surface 196 which extends perpendicular to a guide mandrel axis 194 and protrudes beyond a made-to-fit cylinder 198 which is introducible with an exact fit into the piston pin bearing eye 72 of the connecting rod 66. Seated at a front end of the made-to-fit cylinder 198 to facilitate introduction of the made-to-fit cylinder 198 into the piston pin bearing eye 72 is a frusto-conical part 200 which like the made-to-fit cylinder 198 is likewise deranged coaxially with the guide mandrel axis 194. This frusto-conical part 200 has conical surfaces 202 extending from cylinder surfaces 204 to an en(J face 206 of the guide mandrel 192.

The made-to-fit cylinder 198 and the frusto-conical part 200 preferably extend from the ring surface 196 as far as the end face 206 in the direction of the guide mandrel axis 194 half-way through the piston pin bearing eye 72 at the most, to enable the connecting rod 66 to also be mounted with the piston pin bearing eye 72 on a fixing mandrel which will be described hereinbelow.

By means of the made-to-fit cylinder 198 of the guide mandrel 192, the connecting rod 66 is held as a whole by the gripper 36 in a defined position. The large bearing eye 68 is thereby also aligned in a defined manner for the large bearing eye 68 as well as the piston pin bearing eye 62 are machined at defined spacings in the blank of the connecting rod.

In order to hold the connecting rod 66 during transportation by the gripper 36 on the guide mandrel 192, in particular on the made-to-fit cylinder 198, the gripper 36 is provided with a securing finger 208. When the connecting rod is seated on the guide mandrel 192, the securing finger 208 extends on a side of the guide mandrel 192 opposite the rod part 70 and has a securing nose 210 which can be brought into a position engaging over the end 76 of the connecting rod and fixing this end between itself and the ring surface 196. For this purpose, the securing finger 208 is movable as a whole perpendicular to the guide mandrel axis 194 away from the guide mandrel 192 or towards the latter in a holding direction 212 between a position securing the end 76, illustrated in FIG. 10, and a position releasing the end 76.

The connecting rod 66 is gripped by the gripper 36, more particularly, in the area of the center arc 86, and preferably at the center of the latter. For this purpose, the gripper 36 is provided with a gripping finger 214 having at its front end a holding prism 216 having two prism surfaces 218a and 218b inclined towards each other. The prism surfaces 218a and 218b extend parallel to the guide mandrel axis 194 and are inclined in the direction towards the outer transverse surfaces 88a and 88b in order to fix the connecting rod 66 such that the continuation of the longitudinal direction 74 of the rod part 70 lies centered between the two prism surfaces 218a and 218b.

Furthermore, the holding prism 216 is also provided with two holding attachments 220 and 222 which engage over the connecting rod 66 in the area of the center arc 86 on both sides thereof and secure it against movement in the mounting direction 186 or in the opposite direction when the holding prism 216 rests with the prism surfaces 218 on the center arc 86.

To bring the holding prism 216 with the prism surfaces 218a and 218b into abutment with the center arc 86, the gripping finger is likewise movable in the holding direction 212 perpendicular to the guide mandrel axis 194 towards the center arc 86 or away from it.

In order to move the securing finger 208 and the gripping finger 214 in the holding direction 212, two actuating drives 224 and 226 are provided on the gripper frame 190. These are activated by a gripper control means which is not illustrated in the drawing. The gripper control means preferably operates such that the actuating drive 224 and the actuating drive 226 are jointly activated, more particularly, such that the actuating drives 224 and 226 move the securing finger 208 and the gripping finger 214 either away from the guide mandrel 192 or towards it so that the securing nose 210 and the holding prism 216 are either movable into their position releasing the connecting rod 66 or into their position securing the connecting rod 66.

To enable the connecting rod to be deposited in the individual stations 14, 22, 24 and 26, the gripper 36 is additionally provided with an ejector 228 which is movable parallel to the guide mandrel axis 194 and arranged such that it acts approximately at the center of the rod part 70 at the transition thereof to the second bearing bushing 104 on the latter.

This ejector is in the form of a bolt 230 which is guided in a sleeve 232 and a drive rod 234 and is connected to an ejector drive 236 formed by a spring. With this ejector drive the bolt 230 is movable in an ejecting direction 238.

The gripper 36 is additionally provided with two holding fingers 240a and 240b which are arranged such that they engage with their front ends 242 the bearing eye 68 in the area of the second bearing bushing 104 and in relation to the longitudinal direction 74 rest on opposite sides and thereby prevent the connecting rod 66 from tilting about the guide mandrel axis 194.

These holding fingers 240 are stationarily arranged on the gripper frame 190 and merely serve a fixing purpose. Such holding fingers 240 are only provided on the grippers 36, 38 and 40, but not on the grippers 32 and 34 which have access to the severing station 14. Otherwise the grippers 32 and 34 are identical with the gripper 36 and so reference is to be had in full in this connection to the statements on the gripper 36.

A holding station designated in its entirety 250 and illustrated in FIGS. 12, 13 and 14 as used in the further machining devices 22, 24 and 26 comprises a frame designated in its entirety 252 which carries a fixing mandrel 254 fixedly held thereon. This fixing mandrel 254 comprises a made-to-fit cylinder 256 which is introducible into the piston pin bearing eye 72 of the connecting rod 66 and has a slanted part 258 at its end face for better introduction. The made-to-fit cylinder 256 extends with its end face 260 half-way into the piston pin bearing eye 72 at the most. To fix the end 76 of the connecting rod 66 carrying the piston pin bearing eye 72, the fixing mandrel 254 is additionally provided with a stop surface 264 which adjoins the made-to-fit cylinder 256 and is aligned perpendicular to a made-to-fit cylinder axis 262 for positioning of the end 76 of the connecting rod 66 thereagainst.

For alignment of the connecting rod 66 in the holding station 250, the latter is also provided with a centering means 266 on which the connecting rod 66 can be placed with its large bearing eye 68.

The centering means 266 is designed so as to offer on both sides of the severing plane 48 a centering surface 268 for the bearing bushings 102 and 104 but not to fill out the entire large bearing eye 68. Instead it has at least two recesses 270a and 270b so that the connecting rod 66 can be placed on the centering means 266 and thereby guided on the holding fingers 240a, b.

In an insert direction 272 of the connecting rod 66 behind the centering means 266 there is provided on the frame 252 a stop surface 274 against which the second bearing bushing 104 can be placed with a back face 276. Extending above the stop surface 274 is a guide surface 278 for the first bearing bushing 102 which is set back slightly in the insert direction 272 in relation to the stop surface 274. The first bearing bushing 102 is therefore arranged with slight play in relation to the guide surface 278.

The connecting rod 66 inserted in the fixing mandrel 254 and the centering means 266 is positionable with the back face 276 by means of two holding jaws 280a and 280b on the stop surface 274. For this purpose, the holding jaws 280a and 280b can be brought into a position engaging over the front face 184 of the connecting rod 66. Herein press pins 282a and 282b arranged in the holding jaws 280a and 280b are pressingly positionable against the front face 184 of the second bearing bushing 104 so that the second bearing bushing 104 rests with its back face against the stop surface 274. For this purpose, the press pins 282a and 282b are preferably arranged so as to press against the front face 184 in a region of the front face 184 near the severing plane 48.

The holding jaws 280a, b also comprise a guide surface 283 extending above the press pins 282a, 282b. The guide surface 283 extends essentially parallel to the guide surface 278 and at a slight distance from the front face 184 of the first bearing bushing 102 so that, in all, the first bearing bushing is held without force and with play between the guide surfaces 278 and 283.

To enable the connecting rod 66 to be inserted in and removed from the holding station 250 in the insert direction 272, the holding jaws 280a and 280b can be pivoted to the side so that the connecting rod 66 can be moved past these with its two bearing bushings 102 and 104.

The holding jaws 280a and 280b are preferably segments of a partly circular disc 288a and 288b extending from a secant 284a and 284b to a center 286a and 286b of a circle with the secant 284a and 284b extending so far in the direction of the center 286a and 286b of the circle that when the partly circular discs 288a and 288b are turned so that the secants 284a and 284b stand parallel to one another, insertion or removal of the connecting rod 66 in the insert direction 272 or in the opposite direction past the partly circular discs 288a and 288b is possible. In this embodiment, the holding jaws 280a and 280b then adjoin the secants 284a and 284b and can be brought into a position engaging over the front face 184 of the connecting rod 66 by turning the partly circular discs 288a and 288b.

For this purpose, the partly circular discs 288a and 288b are held on a shaft 290a and 290b which, in turn, is rotatable in a bore 292a and 292b in the frame 252 of the holding station 250 and displaceable in the direction of its longitudinal axis 294a and 294b.

The shafts 290a and 290b are moved in the direction of their longitudinal axis 294a and 294b by a piston 296 which is mounted between the bores 292a and 292b in the frame 252 in a cylinder housing 298 for displacement parallel to the longitudinal axes 294a and 294b. A piston rod 300 of this piston 296 is connected via a yoke 302 to the ends 304a and 304b of the shafts 290a and 290b, respectively, opposite the partly circular discs 288a and 288b so that the shafts 290a and 290b are jointly displaceable in the direction of the axes 294a and 294b via the piston rod 300 when either a first piston face 306 or a second piston face 308 is acted upon.

Furthermore, each of the shafts 290a and 290b is provided with a groove 310 which extends in a first section 312 parallel to the longitudinal axis 294a and 294b, respectively, and in an adjoining second section 314 in the form of a thread. A pin 316 engages this groove 310 with its front end 318.

In the position of the holding jaws 280a and 280b in which these press with the press pins 282a and 282b on the front face 184 of the second bearing bushing 104, the front end 318 of the pin 316 lies in a front area of the first section 312. When the shafts 290a and 290b move in the direction opposite to the insert direction 272 and hence in the direction of lifting-off of the press pins 282a and 282b from the front face 184 owing to the second piston face 308 being acted upon with hydraulic medium, then the front end 318 of the pin 316 first moves in the first section 312 so that the shafts 290a and 290b merely execute a linear movement parallel to their axes 294a and 294b, respectively. After passing through the first section 312, the front end 318 then enters the second section 314 extending in the form of a thread in the shaft 290a and 290b, respectively, so that upon further movement of the respective shaft 290a and 290b, respectively, in this direction, the shaft 290a, b not only carries out a linear movement in the direction of the axes 294a and 294b as hitherto, but simultaneously a rotation which results in pivotal movement of the partly circular discs 288a and 288b such that at the end of the pivotal movement the press pins 282a and 282b are completely lifted off the front face and pivoted to the side such that the secants 284a and 284b stand parallel to one another. This is, for example, a pivotal movement of the partly circular discs 288a and 288b through approximately 70°. In this front position, the connecting rod 66 can now be removed in the direction opposite to the insert direction 272 from the holding station 250 and a new connecting rod inserted in it.

If, on the other hand, the first piston face 306 is acted upon with pressure medium, the shafts 290a and 290b, respectively, move in the insert direction 272 and on account of the front end 318 of the pin 316 running along the second section 314 of the groove 310 execute a return pivotal movement until the front end 318 reaches the first section so that the last part of the movement no longer includes a pivotal movement but merely a linear displacement with which the press pins 282a and 282b are brought into abutment with the front face 184.

The machining installation 10 according to the invention operates as follows:

A connecting rod 66 which has not yet been severed is first gripped by the gripper 32, and the entire gripper carrier 30 is then moved first in the clocking direction 28 and subsequently in the mounting direction 186 so that the gripper 32 inserts an unsevered connecting rod 66 in the severing station 14.

To this end, the transverse jaws 90 and 100 and the side fixing jaws 92 and 96 are standing in their mounting position and the two halves 44 and 46 of the mandrel are driven together so far that they rest against one another with their facing surfaces 112 and 114.

After mounting of the connecting rod 66, the two halves 44 and 46 of the mandrel 42 are driven so far apart that they rest against the large bearing eye 68 and hold the connecting rod 66 fixed in its mounted position.

At the same time, the connecting rod 66 is secured, as shown in FIG. 3, against pivotal movement about the mandrel axis 166 by the end 76 of the rod part 70 lying between the holding surfaces 78a and 78b.

In this position, the transverse jaws 90 and 100 and the side fixing jaws 92 and 96 are driven into the fixing position, as shown in FIG. 4B, in which they rest against the connecting rod 66 in the region of the large bearing eye 68 as described hereinabove.

By the subsequent movement of the slide 52 by means of the pressure cylinder 62 in the severing direction 64, the connecting rod 66 is severed in the severing plane 48 and thus divided into the first bearing bushing 102 and the second bearing bushing 104.

Figure 4C:
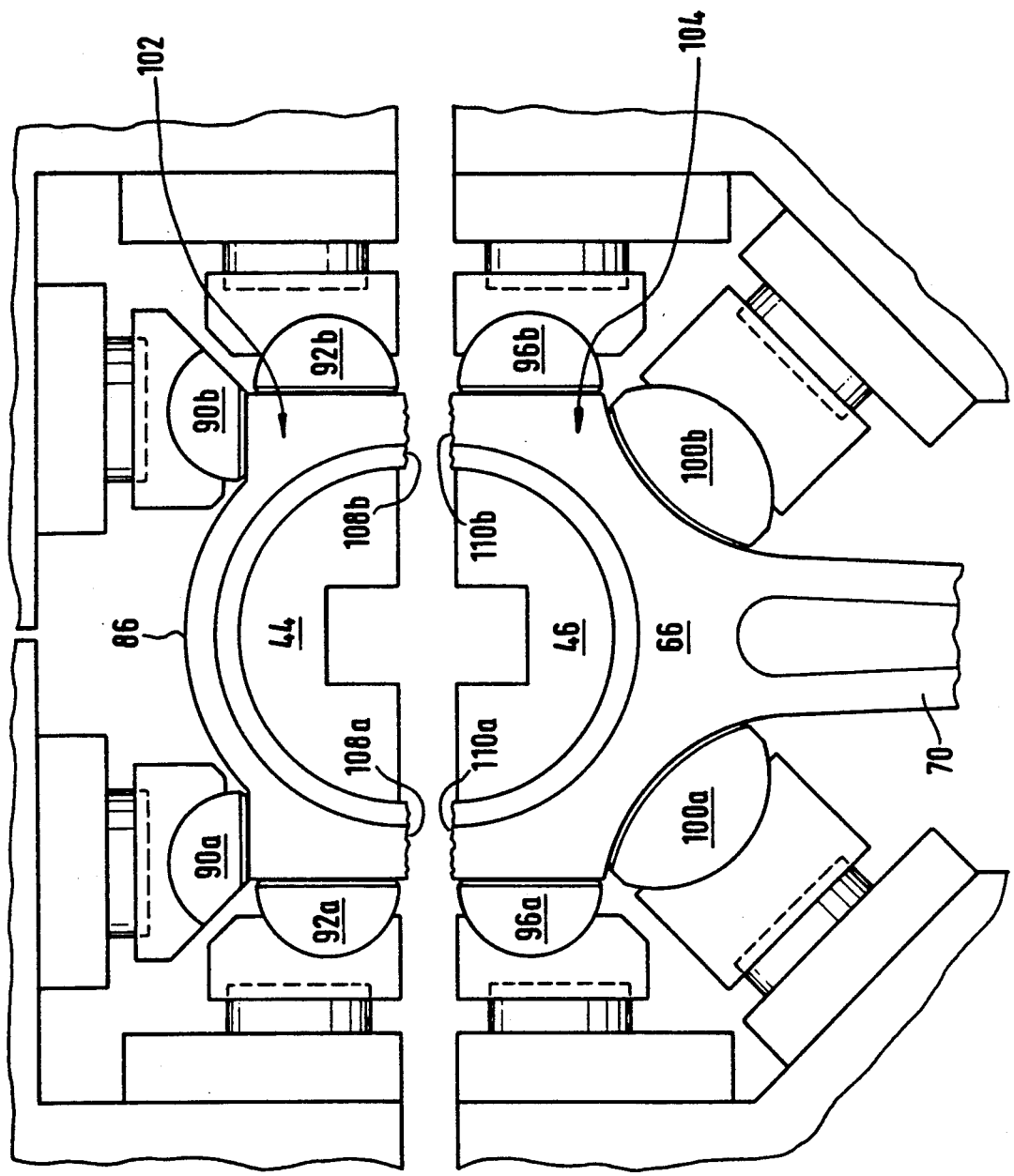
FIG. 4C shows an illustration of the halves of the mandrel moved apart for the severing with jaws standing in the fixing position.
Figure 4D:
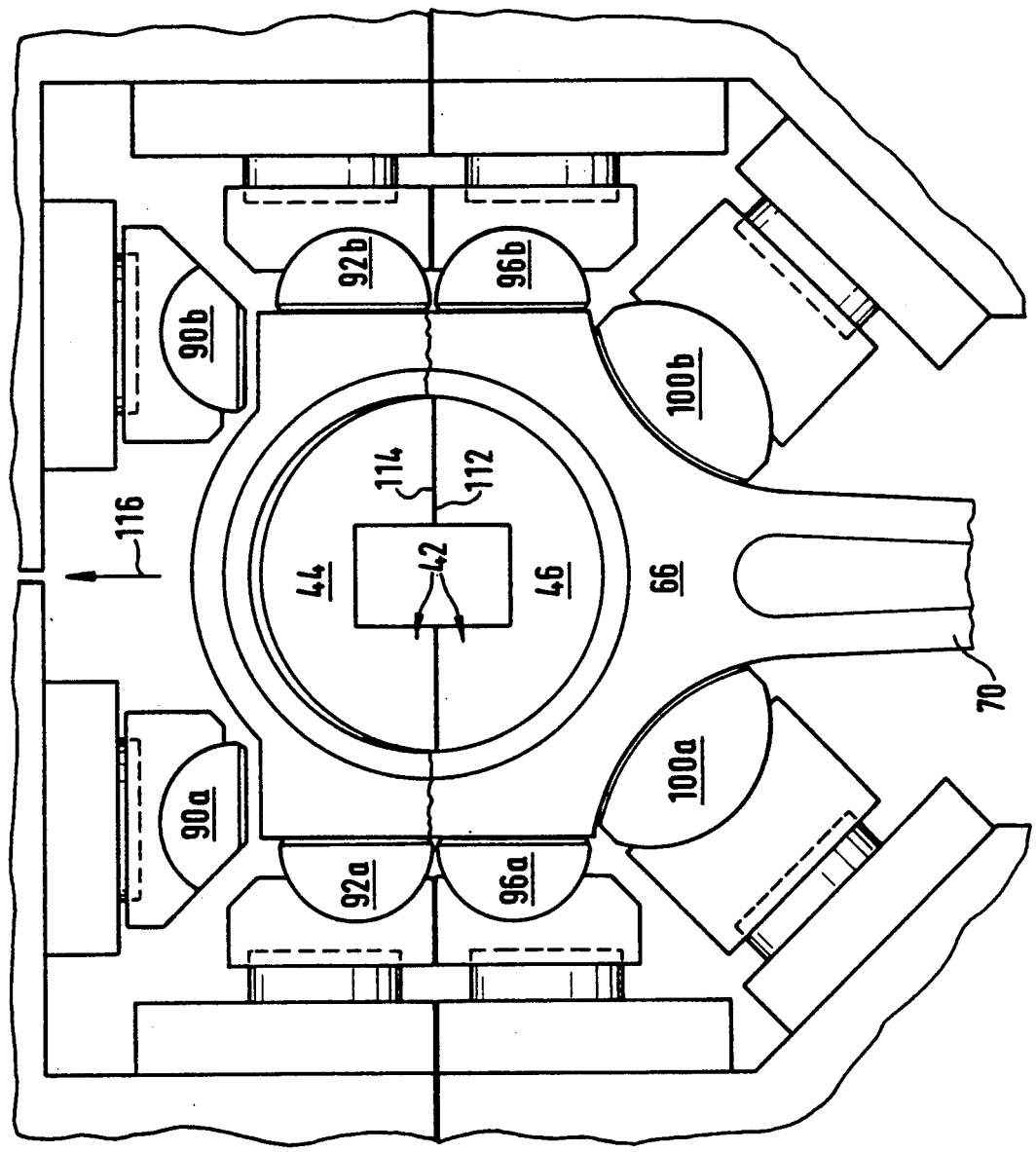
FIG. 4D shows an illustration of the halves of the mandrel moved together after the severing to join the two bearing bushings produced by the severing.

Subsequent joining of the severed connecting rod, i.e., the first bearing bushing 102 and the second bearing bushing 104 is carried out by driving the second half 46 back in the direction opposite to the severing direction 64 until, as illustrated in FIG. 4D, the facing surfaces 112 and 114 of the two halves 44 and 46 rest against one another.

Before driving back the second half 46, the first transverse jaws 90 are driven back into their mounting position so that the first bearing bushing 102, as illustrated in FIG. 4D, can move upwards in the direction opposite to the severing direction 64 after the severed surfaces 108 and 110 have touched.

Since the side fixing jaws 92 and 96 are not designed so as to follow up in the advancing direction 122 when the severing takes place but remain in their position in which they were placed when originally positioned against the still unsevered connecting rod 66, the first bearing bushing 102 and the second bearing bushing 104 are held in their original position also after the severing so that the severed surfaces 108 and 110 are fitted together when the second half 46 of the mandrel 42 is driven in the direction opposite to the severing direction 64.

While the first bearing bushing 102 and the lower bearing bushing 104 are still held in the joined position by the two transverse jaws 100 and the side fixing jaws 92 and 96, the gripper 34 moves in the mounting direction 186 towards the joined connecting rod 66, more specifically, such that it moves with the made-to-fit cylinder 198 of the guide mandrel into the piston pin bearing eye 72, with the securing finger 208 and the gripping finger 214 standing in their position which releases the connecting rod 66. After the made-to-fit cylinder 198 has moved in, the securing finger 208 and the gripping finger 214 are moved by the actuating drives 224 and 226 into their position which secures the connecting rod 66.

Before removal of the connecting rod, the second transverse jaws 100 and the side fixing jaws 92 and 96 are moved back into their mounting position illustrated in FIG. 4A so that the connecting rod 66 can be removed with the joined bearing bushings 102 and 104. The gripper 34 thereby moves back in the direction opposite to the mounting direction 186 transversely to the clocking direction 28, then in the clocking direction 28 and then again in the insert direction 272 in the direction towards the holding station 250 in the further machining device 16.

For insertion of the joined connecting rod in the holding station 250, the partly circular discs 288a and 288b are, as mentioned previously, oriented such that the secants 284a and 284b stand parallel and the holding jaws 280a and 280b are pivoted to the side.

When the joined connecting rod 66 is inserted in the holding station 250, the guide mandrel axis 194 is aligned coaxially with the made-to-fit cylinder axis 262 of the fixing mandrel 254 so that the fixing mandrel 254 likewise engages with its made-to-fit cylinder 256 the piston pin bearing eye 72 while the guide mandrel 192 with its made-to-fit cylinder 198 is also still in engagement with the piston pin bearing eye 72. This is possible because both the guide mandrel 192 and the made-to-fit cylinder 256 each extend half-way into the piston pin bearing eye 72 at the most.

When the joined connecting rod is moved in the insert direction 272, it is positioned, on the one hand, with the end 76 against the stop surface 264 of the fixing mandrel 254 and, on the other hand, with the back face 276 of the second bearing bushing 104 against the stop surface 174. At the same time, the centering means 266 is introduced into the large bearing eye 68 and hence additionally fixes the connecting rod 66.

The connecting rod 66 is held in this position until the holding jaws 280a and 280b are pivoted in front of the front face 184 and press with the press pins 282a and 282b against the second bearing bushing 104 in the insert direction 272 and thus urge it with pressure against the stop surface 274.

Since the gripper 34 engages the piston pin bearing eye 72 with the guide mandrel 192 and presses with the holding prism 216 the first bearing bushing 102 against the second bearing bushing 104, but otherwise does not engage the connecting rod 66, such movement of the holding jaws 280a and 280b can take place without these colliding with the gripper 34.

After the joined connecting rod 66 has been fixed by the holding jaws 280a and 280b, the securing finger 208 and the gripping finger 214 are moved again by the actuating drives 224 and 226 into the position which releases the joined connecting rod 66 and the gripper 34 can move with its guide mandrel 192, in particular its made-to-fit cylinder 198, out of the piston pin bearing eye in the direction opposite to the insert direction 272.

In this position, the first bearing bushing 102 now rests freely on the second bearing bushing 104 fixed in the holding station 250, with the first bearing bushing 102 being fixed with play between the guide surfaces 278 and 283 so that the severed surfaces 108 and 110 which have fitted together during the joining again have the possibility, owing to the play with which the bearing bushing 102 is guided, of remaining fitted together and hence eliminating deformations in the first and second bearing bushings 102 and 104 and a resulting, non-plane-parallel alignment of the front faces and back faces thereof owing to the joining of the severed surfaces 108 and 110.

In the holding station 250, screws can, for example, now be screwed in to screw the first bearing bushing 102 to the second bearing bushing 104.

In like manner, the holding station 250 can be used in the next further machining station 24 and 26 to, for example, release the screws screwed-in in the further machining station 22 again, clean the severed surfaces 108 and 110, for example, by blowing and screw in the screws again.

Transfer from the further machining station 22 to the further machining station 24 and 26 is then carried out by the grippers 36 and 38, and the gripper 40 then removes the connecting rod from the further machining station 26 and places it on a further transportation device.

As described hereinabove, the grippers 36, 38 and 40 are still provided with the holding fingers 240 in order to support the connecting rod better during transportation from the further machining station 22 to the further machining stations 24 and 26.

The present disclosure relates to the subject matter disclosed in German application No. P 40 37 429.7 of Nov. 14, 1990, the entire specification of which is incorporated herein by reference.

What is claimed is:

1. A machining installation for severing machine parts having a bearing eye into first and second bearing bushings, comprising:

a mandrel having two halves on which the bearing eye of said machine part can be mounted, said halves being movable apart in a severing direction to sever the machine part mounted thereon;

two first side fixing elements for fixing said first bearing bushing transversely to said severing direction;

two second side fixing elements for fixing said second bearing bushing transversely to said severing direction; and means for advancing said first and second side fixing elements in an advancing direction towards said machine part mounted on said mandrel into a side fixing position for said machine part before severing;

means for locking said first and second side fixing elements against movement from said side fixing position in a direction opposite to said advancing direction before severing without placing tension on said machine part;

wherein during severing said first and second side fixing elements in their side fixing positions restrain said machine part against movement opposite to said advancing direction beyond said side fixing position of said respective side fixing element without maintaining deformations that occur when the machine part is being severed.

2. A machining installation as defined in claim 1 wherein said means for advancing and locking said first and second side fixing elements comprise:

carriers for holding said side fixing elements and mounted in guides for movement transversely to said severing direction; and locking wedges associated with said carriers for locking said carriers to prevent movement of said side fixing elements beyond their side fixing position in said direction opposite to said advancing direction.

3. A machining installation as defined in claim 2 wherein said locking wedges are displaceable into and out of engagement with said carriers, and further comprising means for immovably fixing said locking wedges to prevent their displacement.

4. A machining installation as defined in claim 3 further comprising:

slides for holding and enabling the displacement of said locking wedges;

wherein said means for immovably fixing said locking wedges comprise clamping bushings.

5. A machining installation as defined in claim 1, wherein said side fixing elements rest against a side surface of said machine part.

6. A machining installation as defined in claim 5 wherein each of said side fixing elements rests against a respective side surface of said machine part with a contact surface that extends lengthwise in said severing direction, said contact surface having a width which is less than the width of the respective side surface of said machine part against which said contact surface rests.

7. A machining installation as defined in claim 1 wherein said side fixing elements are pivotable about an axis of tilt extending parallel to an axis of said mandrel.

8. A machining installation as defined in claim 1 wherein each of said side fixing elements rests against a respective side surface of said machine part with a contact surface that extends lengthwise in said severing direction, said contact surface having a width which is at least as great as the width of the respective side surface of said machine part against which said contact surface rests.

9. A machining installation as defined in claim 1 wherein said side fixing elements are tiltable about an axis of tilt extending parallel to said severing direction.

10. A machining installation as defined in claim 1 wherein said first side fixing elements include means for securing said first bearing bushing against movement in a direction opposite to a mounting direction along which said machine part is moved for mounting it on said mandrel.

11. A machining installation as defined in claim 1 further comprising:

a first transverse fixing element for fixing said first bearing bushing in said severing direction;

means for advancing said first transverse fixing element towards said machine part mounted on said mandrel into a transverse fixing position for said machine part.

12. A machining installation as defined in claim 11 further comprising:

means for advancing said first transverse fixing element in a direction essentially parallel to said severing direction and towards said machine part into said transverse fixing position before severing; and means for locking said first transverse fixing element in said transverse fixing position without placing tension on said machine part before severing.

13. A machining installation as defined in claim 11 further comprising:

at least one second transverse fixing element for fixing said second bearing bushing in said severing direction;

means for advancing said second transverse fixing element towards said machine part mounted on said mandrel into a transverse fixing position for said machine part.

14. A machining installation as defined in claim 13 further comprising:

means for advancing said second transverse fixing element in a direction essentially parallel to said severing direction and towards said machine part into said transverse fixing position before severing; and means for locking said second transverse fixing element in said transverse fixing position without placing tension on said machine part before severing.

* * * * *